United States Patent
Kallepalle et al.

(10) Patent No.: US 11,713,047 B2
(45) Date of Patent: Aug. 1, 2023

(54) TECHNOLOGIES FOR DRIVER BEHAVIOR ASSESSMENT

(71) Applicant: CalAmp Corp., Irvine, CA (US)

(72) Inventors: Bhavadeep Kallepalle, Irvine, CA (US); Malavika Hegde, Irvine, CA (US); Brian J. Burda, Irvine, CA (US); Kinana Hussain, Irvine, CA (US)

(73) Assignee: CALAMP CORP., Irvine, CA (US)

( * ) Notice: Subject to any disclaimer, the term of this patent is extended or adjusted under 35 U.S.C. 154(b) by 0 days.

(21) Appl. No.: 17/180,832

(22) Filed: Feb. 21, 2021

(65) Prior Publication Data

US 2021/0261140 A1 Aug. 26, 2021

Related U.S. Application Data

(60) Provisional application No. 62/979,587, filed on Feb. 21, 2020.

(51) Int. Cl.
*B60W 40/09* (2012.01)
*H04N 7/18* (2006.01)
*G06V 20/59* (2022.01)

(52) U.S. Cl.
CPC ........... *B60W 40/09* (2013.01); *G06V 20/597* (2022.01); *H04N 7/183* (2013.01); *H04N 7/188* (2013.01); *B60W 2420/42* (2013.01)

(58) Field of Classification Search
CPC .............. B60W 40/09; B60W 2420/42; G06V 20/597; G06V 20/56; H04N 7/183; H04N 7/188
See application file for complete search history.

(56) References Cited

U.S. PATENT DOCUMENTS

| | | | |
|---|---|---|---|
| 10,147,247 B2 * | 12/2018 | Nishida | G07C 5/008 |
| 11,386,325 B1 * | 7/2022 | Srinivasan | G06N 3/045 |
| 2010/0250021 A1 | 9/2010 | Cook et al. | |
| 2014/0210625 A1 | 7/2014 | Nemat-Nasser | |
| 2015/0307048 A1 * | 10/2015 | Santora | B60R 21/013 |
| | | | 348/148 |
| 2015/0371096 A1 * | 12/2015 | Stein | G06V 20/58 |
| | | | 382/103 |

(Continued)

OTHER PUBLICATIONS

PCT Search Report and Written Opinion prepared for PCT/US2021/018948, completed May 13, 2021.

(Continued)

*Primary Examiner* — Ryan W Sherwin
(74) *Attorney, Agent, or Firm* — Barnes & Thornburg LLP

(57) ABSTRACT

Technologies assessing driver behavior include a vehicle telematics device configured to analyze sensor data from one or more vehicle sensors to detect whether a vehicle event has occurred and to communicate with a vehicle camera system to obtain video data associated with the detected vehicle event. The vehicle telematics device may transmit the obtained sensor data and/or video data to a remote server system. The vehicle telematics device may also receive a notification from the vehicle camera system that indicates the vehicle camera system has detected a vehicle event. In response to the notification, the vehicle telematics device may obtain sensor data form the one or more vehicle sensors and/or video data from the vehicle camera system and transmit the sensor and/or video data to the remove server system.

19 Claims, 10 Drawing Sheets

(56) References Cited

U.S. PATENT DOCUMENTS

| | | | |
|---|---|---|---|
| 2016/0098868 A1 | 4/2016 | Lambert et al. | |
| 2017/0124788 A1* | 5/2017 | Nishida | G07C 5/0866 |
| 2017/0341611 A1* | 11/2017 | Baker | B60R 21/16 |
| 2018/0342068 A1* | 11/2018 | Hasejima | G06T 7/269 |
| 2018/0357484 A1* | 12/2018 | Omata | G06V 20/582 |
| 2019/0122460 A1* | 4/2019 | Reyes | G06V 20/56 |
| 2019/0213425 A1* | 7/2019 | Anderson | G08G 1/0112 |
| 2020/0094763 A1* | 3/2020 | Nakamura | G06V 40/172 |
| 2020/0171951 A1* | 6/2020 | Matsumoto | G02B 27/0101 |
| 2020/0177835 A1* | 6/2020 | Muncy | H04N 9/8205 |
| 2021/0227031 A1* | 7/2021 | ElHattab | G06V 20/40 |
| 2021/0237594 A1* | 8/2021 | Prasad | G07C 5/0825 |
| 2021/0256327 A1* | 8/2021 | Peranandam | G01V 1/001 |
| 2022/0327406 A1* | 10/2022 | Balakrishnan | G06F 16/285 |
| 2022/0358307 A1* | 11/2022 | Coleman | G06V 20/40 |
| 2022/0402505 A1* | 12/2022 | Simoncini | G07C 5/008 |

OTHER PUBLICATIONS

International Preliminary Report on Patentability prepared for PCT/US2021/018948, dated Sep. 1, 2022.

* cited by examiner

TECHNOLOGIES FOR DRIVER BEHAVIOR ASSESSMENT

CROSS-REFERENCE TO RELATED APPLICATION

The present patent application claims priority to and the benefit of U.S. Provisional Patent Application Ser. No. 62/979,587, entitled "Systems and Methods for Driver Behavior Assessment," which was filed on Feb. 21, 2020, the entirety of which is expressly incorporated herein by reference.

FIELD OF THE DISCLOSURE

The present disclosure relates to systems and methods for using information captured by one or more cameras with information detected by a telematics units to assess driver behavior. In particular, the present disclosure relates to technologies for detecting events, such as safety violations performed by a vehicle, and the triggering the recording of video based upon the detected events.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording vehicle information/data related to the operation of the vehicle and providing that information for analysis, whether in real-time or not, such as during a time when the vehicle is being serviced. The vehicle information/data (telematics data) generated by a telematics unit can be used in a variety of applications, such as fleet tracking, shipment tracking, insurance calculations, and in vehicle management and service.

SUMMARY

According to an aspect of the disclosure, a vehicle telematics device for assessing driver behavior may include a camera interface, one or more processors, and one or more memory devices. The camera interface may be configured to communicate with a vehicle camera system of a vehicle to obtain video data produced by the vehicle camera system. The one or more memory devices may be communicatively coupled to the one or more processors and may have stored therein a plurality of instructions that, when executed by the one or more processors, cause the vehicle telematics device to obtain sensor data from at least one vehicle sensor of the vehicle; analyze the sensor data to detect whether a vehicle event has occurred; communicate, in response to detection of the vehicle event, with the vehicle camera system to obtain video data associated with the detected vehicle event from the vehicle camera system; and transmit, in response to detection of the vehicle event, the video data associated with the detected vehicle event and the sensor data to a remote server system.

In some embodiments, to obtain the sensor data may include to obtain sensor data from a vehicle sensor external to the vehicle telematics device and installed in the vehicle. Additionally or alternatively, to obtain the sensor data may include to obtain sensor data from a vehicle sensor located in the vehicle telematics device.

Additionally, in some embodiments, to analyze the sensor data may include to analyze the sensor data to detect whether a vehicle event indicative of a safety violation of the operation of the vehicle has occurred. For example, to analyze the sensor data may include to analyze the sensor data over a period of time and/or to compare the sensor data to a reference threshold.

In some embodiments, to communicate with the vehicle camera system may include to transmit, in response to detection of the vehicle event, an instruction to the vehicle camera system to begin recording video. Additionally or alternatively, to communicate with the vehicle camera system may include to request video data from the vehicle camera system that includes a time period prior to the detection of the vehicle event.

Additionally, in some embodiments, the plurality of instructions, when executed by the one or more processors, may further cause the vehicle telematics device to analyze the video data associated with the detected vehicle event to verify that the detected vehicle event has occurred. In such embodiments, to transmit the video data associated with the detected vehicle event and the sensor data to a remote server system may include to transmit, in response to verification that the detected vehicle event has occurred, the video data associated with the detected vehicle event and the sensor data to a remote server system.

In some embodiments, the plurality of instructions, when executed by the one or more processors, may further cause the vehicle telematics device to generate a vehicle event message in response to detection of the vehicle event, wherein the vehicle event message includes the video data associated with the detected vehicle event and the sensor data. In such embodiments, to transmit the video data associated with the detected vehicle event and the sensor data may include to transmit the vehicle event message to the remote server system.

Further, in some embodiments, the plurality of instructions, when executed by the one or more processors, may further cause the vehicle telematics device to monitor for a request from the remote server system subsequent to the transmission of the video data associated with the detected vehicle event and the transmitted sensor data; obtain, based on the request, additional sensor data from at least one vehicle sensor of the vehicle; and transmit the additional sensor data to the remote server system. Additionally or alternatively, in some embodiments, the plurality of instructions, when executed by the one or more processors, may further cause the vehicle telematics device to monitor for a request from the remote server system subsequent to the transmission of the video data associated with the detected vehicle event and the transmitted sensor data; obtain, based on the request, additional video data from the vehicle camera system; and transmit the additional video data to the remote server system.

According to another aspect of the disclosure, a method for assigning deriver behavior of a vehicle may include obtaining, by a vehicle telematics device, sensor data from at least one vehicle sensor of the vehicle; analyzing, by the vehicle telematics device, the sensor data to detect whether a vehicle event has occurred; communicating, by the vehicle telematics device and in response to detection of the vehicle event, with a vehicle camera system of the vehicle to obtain video data associated with the detected vehicle event from the vehicle camera system; and transmitting, by the vehicle telematics device and in response to detection of the vehicle event, the video data associated with the detected vehicle event and the sensor data to a remote server system.

In some embodiments, analyzing the sensor data may include analyzing the sensor data to detect whether a vehicle event indicative of a safety violation of the operation of the vehicle has occurred. Additionally, in some embodiments, communicating with the vehicle camera system may include transmitting, by the vehicle telematics device and in response to detection of the vehicle event, an instruction to the vehicle camera system to begin recording video. Further, in some embodiments, the method may further include monitoring, by the vehicle telematics device, for a request from the remote server system subsequent to the transmission of the video data associated with the detected vehicle event and the transmitted sensor data; obtaining, based on the request, additional sensor data from at least one vehicle sensor of the vehicle; and transmitting the additional sensor data to the remote server system.

According to a further aspect of the disclosure, one or more non-transitory, machine-readable storage media may include a plurality of instructions stored thereon that, when executed, cause a vehicle telematics device to obtain sensor data from at least one vehicle sensor of a vehicle; analyze the sensor data to detect whether a vehicle event has occurred; communicate, in response to detection of the vehicle event, with a vehicle camera system of the vehicle to obtain video data associated with the detected vehicle event from the vehicle camera system; and transmit, in response to detection of the vehicle event, the video data associated with the detected vehicle event and the sensor data to a remote server system.

In some embodiments, to analyze the sensor data may include to analyze the sensor data to detect whether a vehicle event indicative of a safety violation of the operation of the vehicle has occurred. Additionally, in some embodiments, to communicate with the vehicle camera system may include to transmit, in response to detection of the vehicle event, an instruction to the vehicle camera system to begin recording video. Further, in some embodiments, the plurality of instructions stored thereon that, when executed, may further cause a vehicle telematics device to monitor for a request from the remote server system subsequent to the transmission of the video data associated with the detected vehicle event and the transmitted sensor data; obtain, based on the request, additional sensor data from at least one vehicle sensor of the vehicle; and transmit the additional sensor data to the remote server system.

According to yet another aspect of the disclosure, a vehicle telematics device for assessing driver behavior may include a camera interface, one or more processors, and one or more memory devices. The camera interface may be configured to communicate with a vehicle camera system of a vehicle to obtain video data produced by the vehicle camera system. The one or more memory devices may be communicatively coupled to the one or more processors and may have stored therein a plurality of instructions that, when executed by the one or more processors, cause the vehicle telematics device to receive a notification from the vehicle camera system that indicates the vehicle camera system has detected a vehicle event; obtain, in response to the notification, sensor data from at least one vehicle sensor of the vehicle; communicate, in response to the notification, with the vehicle camera system to obtain video data associated with the detected vehicle event from the vehicle camera system; and transmit, in response to the notification, the video data associated with the detected vehicle event and the sensor data to a remote server system.

In some embodiments, the vehicle event may be indicative of a safety violation of the operation of the vehicle has occurred. Additionally, in some embodiments, the plurality of instructions, when executed by the one or more processors, may further cause the vehicle telematics device to verify that the detected vehicle event has occurred. For example, to verify that the detected vehicle event has occurred may include to analyze the obtained sensor data to verify that the detected vehicle event has occurred. Additionally, to verify that the detected vehicle event has occurred may include to analyze the video data associated with the detected vehicle event to verify that the detected vehicle event has occurred.

Additionally, in some embodiments, to obtain the sensor data may include to obtain sensor data from a vehicle sensor external to the vehicle telematics device and installed in the vehicle. Additionally or alternatively, to obtain the sensor data may include to obtain sensor data from a vehicle sensor located in the vehicle telematics device. In some embodiments, to communicate with the vehicle camera system may include to transmit, in response to the notification, an instruction to the vehicle camera system to begin recording video. Additionally or alternatively, to communicate with the vehicle camera system may include to request video data from the vehicle camera system that includes a time period prior to the notification.

Accordingly to another aspect of the disclosure, a method for assessing driver behavior may include receiving, by a vehicle telematics device, a notification from a vehicle camera system of a vehicle that indicates the vehicle camera system has detected a vehicle event; obtaining, by the vehicle telematics device and in response to the notification, sensor data from at least one vehicle sensor of the vehicle; communicating, by the vehicle telematics device and in response to the notification, with the vehicle camera system to obtain video data associated with the detected vehicle event from the vehicle camera system; and transmitting, by the vehicle telematics device and in response to the notification, the video data associated with the detected vehicle event and the sensor data to a remote server system.

In some embodiments, the vehicle event may be indicative of a safety violation of the operation of the vehicle has occurred. Additionally, in some embodiments, the method may further include verifying the detected vehicle event has occurred. For example, verifying that the detected vehicle event has occurred may include analyzing the obtained sensor data to verify that the detected vehicle event has occurred. Additionally, verifying that the detected vehicle event has occurred may include analyzing the video data associated with the detected vehicle event to verify that the detected vehicle event has occurred.

Additionally, in some embodiments, obtaining the sensor data may include to obtaining sensor data from a vehicle sensor external to the vehicle telematics device and installed in the vehicle. Additionally or alternatively, obtaining the sensor data may include obtaining sensor data from a vehicle sensor located in the vehicle telematics device. In some embodiments, communicating with the vehicle camera system may include transmitting, in response to the notification, an instruction to the vehicle camera system to begin recording video. Additionally or alternatively, communicating with the vehicle camera system may include requesting video data from the vehicle camera system that includes a time period prior to the notification.

According to a further aspect of the disclosure, one or more machine-readable storage media may include a plurality of instructions stored thereon that, when executed, cause a vehicle telematics device to receive a notification from a vehicle camera system of a vehicle that indicates the vehicle camera system has detected a vehicle event; obtain, in response to the notification, sensor data from at least one vehicle sensor of the vehicle; communicate, in response to the notification, with the vehicle camera system to obtain video data associated with the detected vehicle event from the vehicle camera system;

In some embodiments, the vehicle event may be indicative of a safety violation of the operation of the vehicle has occurred. Additionally, in some embodiments, the plurality of instructions, when executed by the one or more processors, may further cause the vehicle telematics device to verify that the detected vehicle event has occurred. For example, to verify that the detected vehicle event has occurred may include to analyze the obtained sensor data to verify that the detected vehicle event has occurred. Additionally, to verify that the detected vehicle event has occurred may include to analyze the video data associated with the detected vehicle event to verify that the detected vehicle event has occurred.

Additionally, in some embodiments, to obtain the sensor data may include to obtain sensor data from a vehicle sensor external to the vehicle telematics device and installed in the vehicle. Additionally or alternatively, to obtain the sensor data may include to obtain sensor data from a vehicle sensor located in the vehicle telematics device. In some embodiments, to communicate with the vehicle camera system may include to transmit, in response to the notification, an instruction to the vehicle camera system to begin recording video. Additionally or alternatively, to communicate with the vehicle camera system may include to request video data from the vehicle camera system that includes a time period prior to the notification.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
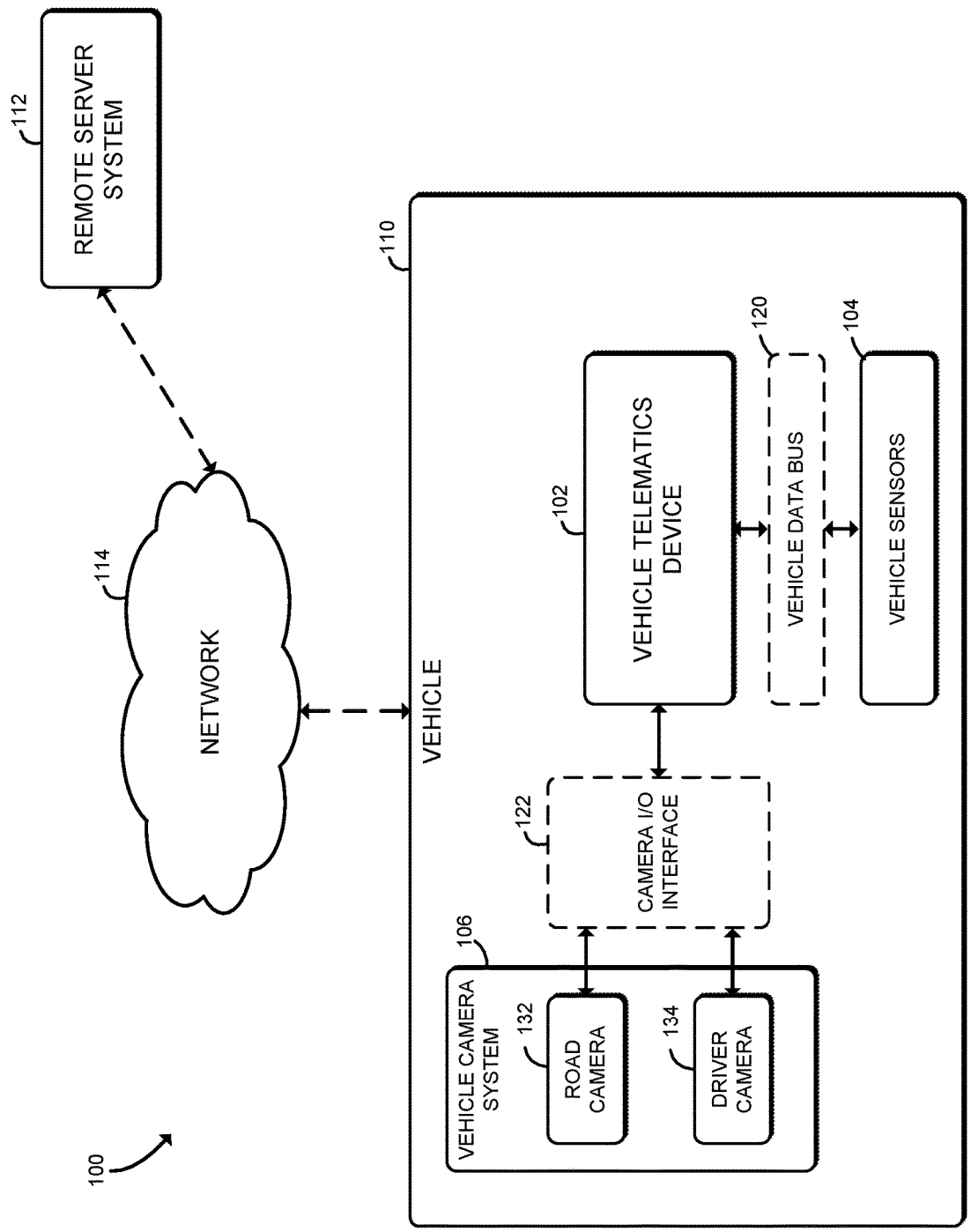
FIG. 1 is a simplified block diagram of at least one embodiment of a system for driver behavior assessment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural and/or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for driver behavior assessment includes a vehicle telematics device 102, one or more vehicle sensors 104, and a vehicle camera system 106, each of which may be installed in or otherwise carried by a vehicle 110. The system 100 also includes a remote server system 112 and a network 114, over which the vehicle telematics device 102 and the remote server system 112 may communicate. In use, as described in more detail below, the vehicle telematics device 102 is configured to analyze the sensor data produced by the vehicle sensors 104 to detect whether a vehicle event has occurred. If the vehicle telematics device 102 determines that a vehicle event has occurred, the vehicle telematics device 102 communicates with the vehicle camera system 106 to obtain video data associated with the vehicle event and subsequently transmits the sensor data and the video data to the remote server system 112 over the network 114. In some embodiments, the vehicle telematics device 102 may perform additional analysis of the sensor data and/or video data to verify the initially detected vehicle event prior to transmitting the sensor and video data to the remote server system 112. Additionally, in some embodiments, the vehicle telematics device 102 may generate a vehicle event message that provides information regarding the detected vehicle event, and which may include the sensor data and/or video data, and transmit the vehicle event message to the remote server system 112.

Additionally, in some embodiments, the vehicle camera system 106 may be configured to analyze the video data produced by the vehicle camera system 106 (e.g., by a road-facing camera 132 and/or a driver-facing camera 134 of the vehicle camera system 106) to detect the occurrence of a vehicle event. If the vehicle camera system 106 detects a vehicle event based on the video data, the vehicle camera system 106 is configured to notify the vehicle telematics device 102. In response, the vehicle telematics device 102 may obtain sensor data from the vehicle sensors 104 and request video data associated with the vehicle event from the vehicle camera system 106. The vehicle telematics device 102 subsequently transmits the sensor data and the video data (e.g., via vehicle event message) to the remote server system 112 over the network 114.

As discussed further below, the detected vehicle event may be embodied as any type of event of the vehicle 110, or related thereto, from which an assessment of driver behavior may be derived. For example, in the illustrative embodiment, the vehicle event is indicative of a safety violation of the operation of the vehicle 110 (e.g., that the vehicle 110 is being operated in a manner that is unsafe, that is against rules of the road, that is against a driver or company policy, etc.).

The vehicle telematics device 102 may be embodied as any type of telematics or computer device, component, circuit or collection thereof that is capable of performing the functions described herein. In some embodiments, the vehicle telematics device 102 may be embodied as a stand-alone unit that may be installed in the vehicle 110 and interconnected with existing systems and/or data busses of the vehicle 110. Alternatively, in other embodiments, the vehicle telematics device 102 may be integrated into another component of the vehicle 110, such as the engine control unit (ECU)/engine control module (ECM) of the vehicle 110.

Figure 2:
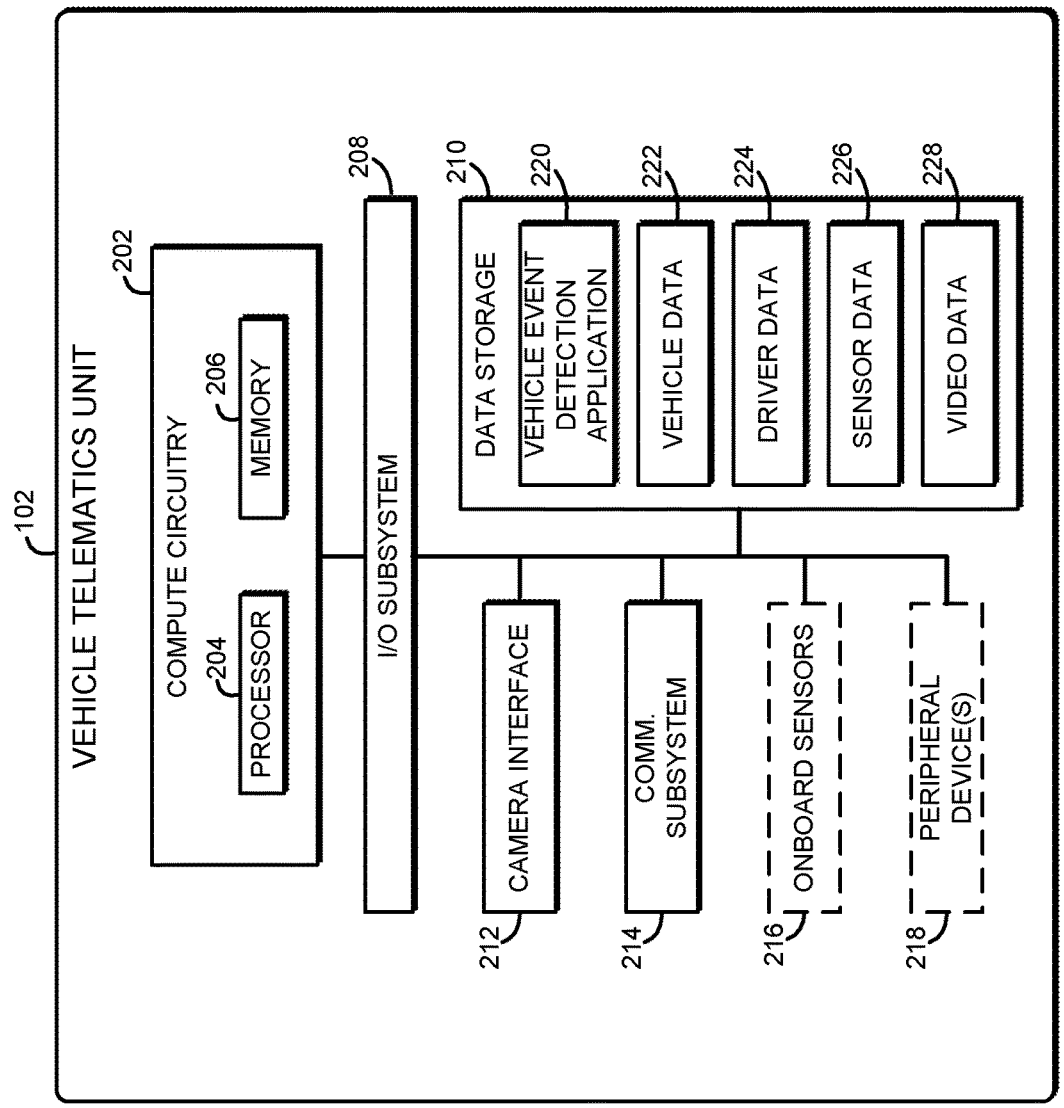
FIG. 2 is a simplified block diagram of at least one embodiment of a vehicle telematics device of the system of FIG. 1.

As shown in FIG. 2, the illustrative vehicle telematics device 102 includes compute circuitry 202, an input/output ("I/O") subsystem 208, a data storage 210, a camera interface 212, a communication subsystem 214, and, optionally, one or more onboard sensors 216 and one or more peripheral devices 218. Of course, it should be appreciated that the vehicle telematics device 102 may include other or additional components, such as those commonly found in a typical compute device or control unit, in other embodiments. Additionally, in some embodiments, one or more of the illustrative components may be incorporated in, or otherwise form a portion of, another component.

The compute circuitry 202 may be embodied as any type of device or collection of devices capable of performing various compute functions. In some embodiments, the compute circuitry 202 may be embodied as a single device such as an integrated circuit, an embedded system, a field-programmable-array (FPGA, a system-on-a-chip (SOC), or other integrated system or device. Additionally, in some embodiments, the compute circuitry 202 includes or is embodied as a processor 204 and memory 206. The processor 204 may be embodied as any type of processor capable of performing the functions described herein. For example, the processor 204 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein.

The compute circuitry 202 is communicatively coupled to other components of the vehicle telematics device 102 via the I/O subsystem 208, which may be embodied as circuitry and/or components to facilitate input/output operations with the compute circuitry 202 (e.g., with the processor 204 and/or memory 206) and other components of the vehicle telematics device 102. For example, the I/O subsystem 208 may be embodied as, or otherwise include, memory controller hubs, input/output control hubs, firmware devices, wired or wireless communication links (i.e., point-to-point links, bus links, wires, cables, light guides, printed circuit board traces, etc.) and/or other components and subsystems to facilitate the input/output operations. In some embodiments, the I/O subsystem 208 may be incorporated, along with the processor 204, the memory 206, and other components of the vehicle telematics device 102, into the compute circuitry 202.

The data storage 210 may be embodied as any type of device or devices configured for short-term or long-term storage of data such as, for example, memory devices and circuits, memory cards, hard disk drives, solid-state drives, or other data storage devices. As shown in FIG. 2, the data storage 210 may store a vehicle event detection application 220, vehicle data 222, driver data 224, sensor data 226, and video data 228. The vehicle event detection application 220 is illustratively be embodied as a set of software and/or firmware instructions, which may be executed by the compute circuitry 202 (e.g., by the processor 204) to perform the functions of the vehicle telematics device 102 described herein.

The vehicle data 222 may be embodied as any type of data that describes a characteristic of the vehicle 110, such as the make, model, year, mileage, features, and/or capabilities of the vehicle 110. Additionally, in some embodiments, the vehicle data 222 may also include vehicle policy rules that define safety parameters of the vehicle (e.g., a maximum allowed speed, an allowable length of operation, etc.). In such embodiments, if the vehicle telematics device 102 determines that a vehicle policy rules has been broken, the vehicle telematics device 102 may determine that a vehicle event has occurred.

The driver data 224 may be embodied as any type of data that describes a characteristic of the driver of the vehicle 110, such as personal characteristics (e.g., age, weight, height), driver restrictions (e.g., glasses or time restrictions), or other characteristic useful to the vehicle telematics device 102 in detecting the occurrence of a vehicle event. Additionally, in some embodiments, the vehicle data 222 may also include driver policy rules that define safety parameters of the driver (e.g., allowed hours for driving, maximum hours allowed to operate the vehicle 110, etc.). In such embodiments, similar to the vehicle policy rules, if the vehicle telematics device 102 determines that a driver policy rules has been broken, the vehicle telematics device 102 may determine that a vehicle event has occurred.

The sensor data 226 may be embodied as any type of data obtained from vehicle sensors 104 of the vehicle 110 (and/or the onboard sensors 216) that is indicative of characteristics of the vehicle 110 and/or a driver of the vehicle 110 during operation of the vehicle 110. For example, depending on the particular vehicle sensor 104 and/or onboard sensors 216, the sensor data 226 may be indicative of a speed of the vehicle 110, acceleration or deceleration of the vehicle 110, location of the vehicle 110, impact or inertia forces exerted on the vehicle 110, weight of the vehicle 110, vibration of the vehicle 110, voltage levels of the vehicle, ignition state of the vehicle, the state of seatbelts of the vehicle 110, operation parameters of the vehicle 110 (e.g., of an engine of the vehicle 110), location of occupants of the vehicle 110, length of operation of the vehicle 110, and/or other characteristics of the vehicle 110 and/or a driver of the vehicle 110 during operation of the vehicle 110. As discussed above, the vehicle telematics device 102 may receive the sensor data 226 from the vehicle sensors 104 and/or the onboard sensors 216 and stored the received sensor data 226 for contemporaneous or subsequent analysis.

The video data 228 may be embodied as any type of video or image data obtained from the vehicle camera system 106 that is associated with or otherwise indicative of the detected vehicle event. As discussed in more detail below, the illustrative vehicle camera system 106 includes the road-facing camera 132 and the driver-facing camera 134. As such, in the illustrative embodiment, the video data 228 includes video from the road-facing camera 132 with contemporaneous video from the driver-facing camera 134 "stitched" or otherwise appended thereto. In some embodiments, the video data 228 may include additional metadata appended thereto by the vehicle camera system 106, such as time or location data.

The camera interface 212 may be embodied as any type of I/O interface capable of facilitating communication between the compute circuitry 202 of the vehicle telematics device 102 and the vehicle camera system 106. As such, the camera interface 212 may include any suitable hardware and/or software that facilities the reception of the video data 228 from the camera interface 212, either via wired or wireless communications. For example, in some embodiments, the camera interface 212 is capable of facilitating a Bluetooth, Wi-Fi connection, or other connection. Additionally, in some embodiments, the camera interface 212 facilitates the control of the cameras of the vehicle camera system 106 (e.g., to begin or stop recording), as discussed in more detail below.

The communication subsystem 214 may be embodied as any type of communication circuit, device, or collection thereof, capable of enabling communications (e.g., the transfer of video and sensor data) between the vehicle telematics device 102 and other components of the system 100 across the network 114. To do so, the communication subsystem 214 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

In some embodiments, the vehicle telematics device 102 may include the one or more onboard sensors 216. Each onboard sensor 216 may be embodied as any type of sensor located on the vehicle telematics device 102 and capable of producing sensor data indicative of characteristics of the vehicle 110 and/or a driver of the vehicle 110 during operation of the vehicle 110. For example, the onboard sensors 216 may be embodied as, or otherwise include, a speed sensor, an inertia or force sensor, an engine revolutions-per-minute (RPM) sensor, a weight sensor, a location sensor (e.g., a Global Positioning System (GPS) module or sensor), a voltage sensor, an ignition sensor, a seatbelt sensor, an occupancy sensor, a noise sensor, a vibration sensor, an acceleration sensor, and/or other sensor capable of producing sensor data indicative of characteristics of the vehicle 110 and/or a driver of the vehicle 110 during operation of the vehicle 110.

Additionally, in some embodiments, the vehicle telematics device 102 may include the one or more peripheral devices 218. Such peripheral devices 218 may include any type of peripheral device commonly found in a compute device such as audio input devices, user interfaces, a display, other input/output devices, interface devices, and/or other peripheral devices.

In some embodiments, the vehicle telematics device 102 is configured to execute scripts to read data and/or perform particular processes. Such scripts may, for example, alter the behavior (e.g., the way sensor data is analyzed) of the vehicle telematics device 102. the scripts may be pre-loaded on the vehicle telematics device 102, obtained from the remote server system 112, and/or programmed into the vehicle telematics device 102 via a suitable programming interface (e.g., via the communication subsystem 214 or the vehicle data bus 120 discussed below). Additionally, the vehicle telematics device 102 may be self-powered (e.g., via a rechargeable battery) and/or be connected into the electrical system of the vehicle 110. For example, the vehicle telematics device 102 may be powered via the vehicle data bus 120 in some embodiments.

Additionally, in some embodiments, the vehicle telematics device 102 (and/or the remote server system 112) may include or otherwise provide for a user interface to allow visualization and interaction with the sensor data and/or video data monitored by the vehicle telematics device 102. Furthermore, in some embodiments, the vehicle telematics device 102 may include or otherwise provide an interface, such as an application programming interface (API) or web service, to provide some or all of the sensor/video data to third-party systems for further processing. Access to such an interface may be open and/or secured using any of a variety of techniques, such as by using client authorization keys.

Referring now back to FIG. 1, the vehicle 110 also includes the vehicle sensors 104. The vehicle sensors 104 may include one or more sensors installed in or attached to the vehicle 110 or otherwise external from the vehicle telematics device 102. Similar to the onboard sensors 216, the vehicle sensors 104 may be embodied as any type of sensor located on the vehicle telematics device 102 and capable of producing sensor data indicative of characteristics of the vehicle 110 and/or a driver of the vehicle 110 during operation of the vehicle 110. For example, the sensor data may be indicative that the vehicle 110 is under hard braking or high acceleration by the driver, is performing a harsh cornering, has been involved in a vehicle crash, has been continuously operated for too long, has a malfunction, and/or other safety violation. Accordingly, similar to the onboard sensors 216, vehicle sensors 104 may be embodied as, or otherwise include, a speed sensor, an inertia or force sensor, an engine revolutions-per-minute (RPM) sensor, a weight sensor, a location sensor (e.g., a Global Positioning System (GPS) module or sensor), a voltage sensor, an ignition sensor, a seatbelt sensor, an occupancy sensor, a noise sensor, a vibration sensor, an acceleration sensor, and/or other sensor capable of producing sensor data indicative of characteristics of the vehicle 110 and/or a driver of the vehicle 110 during operation of the vehicle 110.

The vehicle telematics device 102 may obtain the sensor data from the vehicle sensors 104 via a vehicle data bus 120. The vehicle data bus 120 may be embodied as any type of I/O bus, communications network, or interconnection capable of facilitating the transfer of data between the vehicle sensors 104 and the vehicle telematics device 102. Systems and methods for connecting to a vehicle data bus that can be utilized in accordance with embodiments of the present disclosure are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014.

Figure 3:
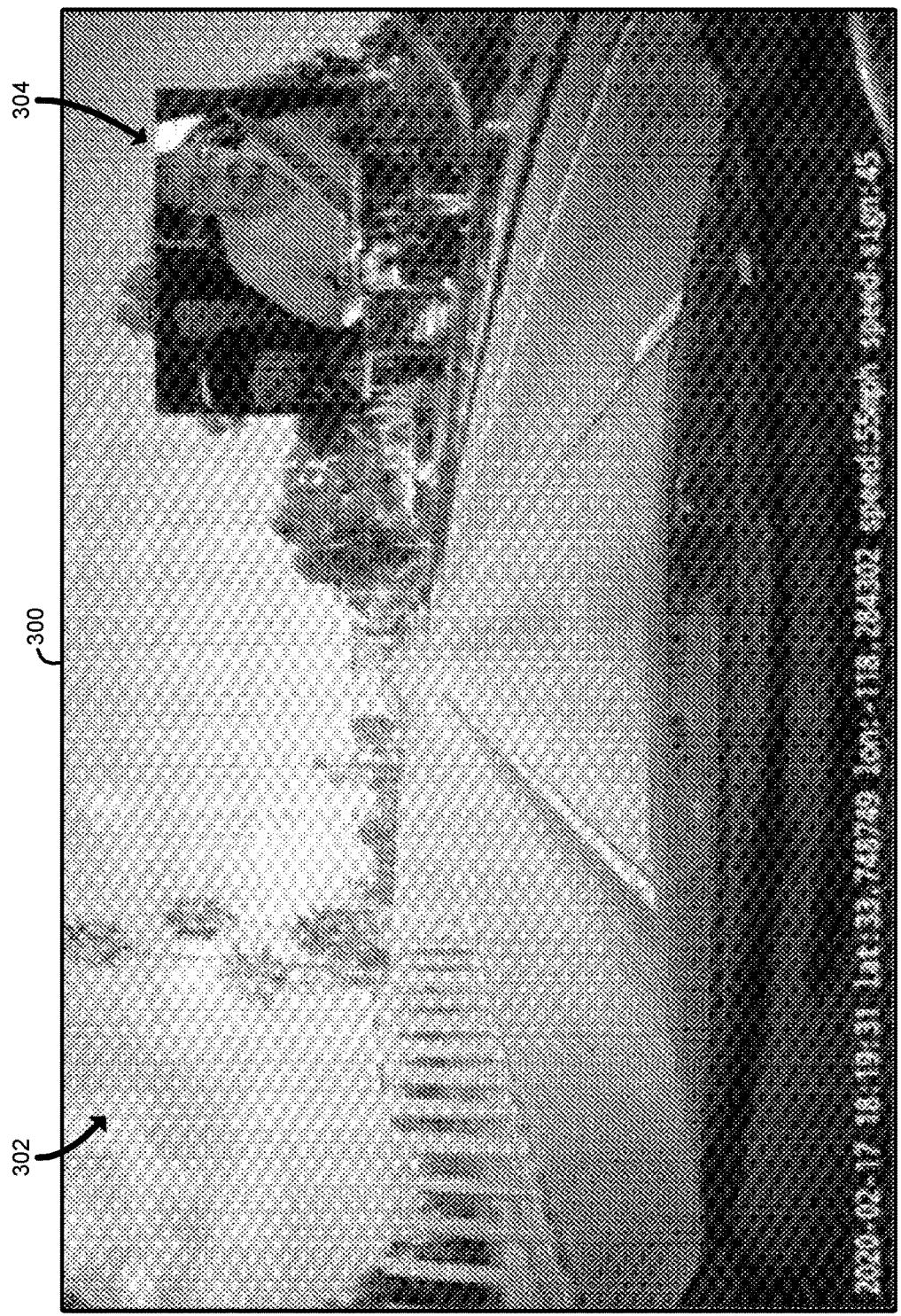
FIG. 3 is a simplified illustration of an image of video data that may be produced by a vehicle camera system of the system of FIG. 1.

As discussed above, the vehicle camera system 106 may be embodied as one or more cameras configured to produce video data (e.g., video or still images) associated with or otherwise indicative of the detected vehicle event. In the illustrative embodiment, the vehicle camera system 106 includes the road-facing camera 132 and the driver-facing camera 134. The road-facing camera 132 may be embodied as any suitable camera or video-producing device installed in or otherwise attached to the vehicle 110 in an orientation such that the road-facing camera 132 is capable of capturing video of the roadway traveled by the vehicle 110. Similarly, the driver-facing camera 134 may be embodied as any suitable camera or video-producing device installed in or otherwise attached to the vehicle 110 in an orientation such that the driver-facing camera 134 is capable of capturing video of the driver of the vehicle 110. In embodiments in which the vehicle camera system 106 includes the road-facing camera 132 and the driver-facing camera 134, the video data produced by the vehicle camera system 106 may video from the road-facing camera 132 with contemporaneous video from the driver-facing camera 134 "stitched" or otherwise appended thereto. For example, an illustrative image 300 of video data produced by the vehicle camera system 106 is shown in FIG. 3. The image 300 includes the video 302 captured by the road-facing camera 132 and the video 304 captured by the driver-facing camera 134 in a picture-in-picture (PIP) format. In the illustrative image 300, the video 304 is located in the top right corner of the video 302, but may be located in other positions in other embodiments. Additionally, although the image 300 illustrates a particular configuration of the cameras 132, 134, it should be appreciated that the cameras 132, 134 (and/or additional cameras) may be located in different locations and/or orientations in or on the vehicle 110 to facilitate the detection of vehicle events. For example, in some embodiments, the vehicle camera system 106 may include cameras located on the back, top, or bottom of the vehicle 110.

In some embodiments, as discussed in more detail below, the vehicle camera system 106 may be configured to analyze the video data produced by the road-facing camera 132 and/or a driver-facing camera 134 to detect the occurrence of a vehicle event and, if a vehicle event is detected, to communication a notification to the vehicle telematics device 102. In such embodiments, the vehicle camera system 106 (e.g., the road-facing camera 132 and/or a driver-facing camera 134) may include suitable compute devices (processors, memory, etc.), similar to the vehicle telematics device 102, to allow the vehicle camera system 106 to perform such analytics on the video data. For example, the vehicle camera system 106 may utilize visual analytics on the video data to detect speeding violations, stop sign violations, lane drifts, tailgating vehicles in front, among various other types of driver behavior.

Referring back to FIG. 1, the vehicle camera system 106 may provide the video data (and notification) to the vehicle telematics device 102 via a camera I/O interface 122. The camera I/O interface may be embodied as any type of I/O bus, communications network, or interconnection capable of facilitating the transfer of video and other data between the vehicle camera system 106 and the vehicle telematics device 102. For example, the camera I/O interface 122 may be embodied as a wired or wireless interface (e.g., a Bluetooth interface) and, in some embodiments, may form a portion of the vehicle data bus 120. In other embodiments, the camera I/O interface 122 may form a portion of the camera interface 212 of the vehicle telematics device 102 and/or a portion of the vehicle camera system 106.

Figure 4:
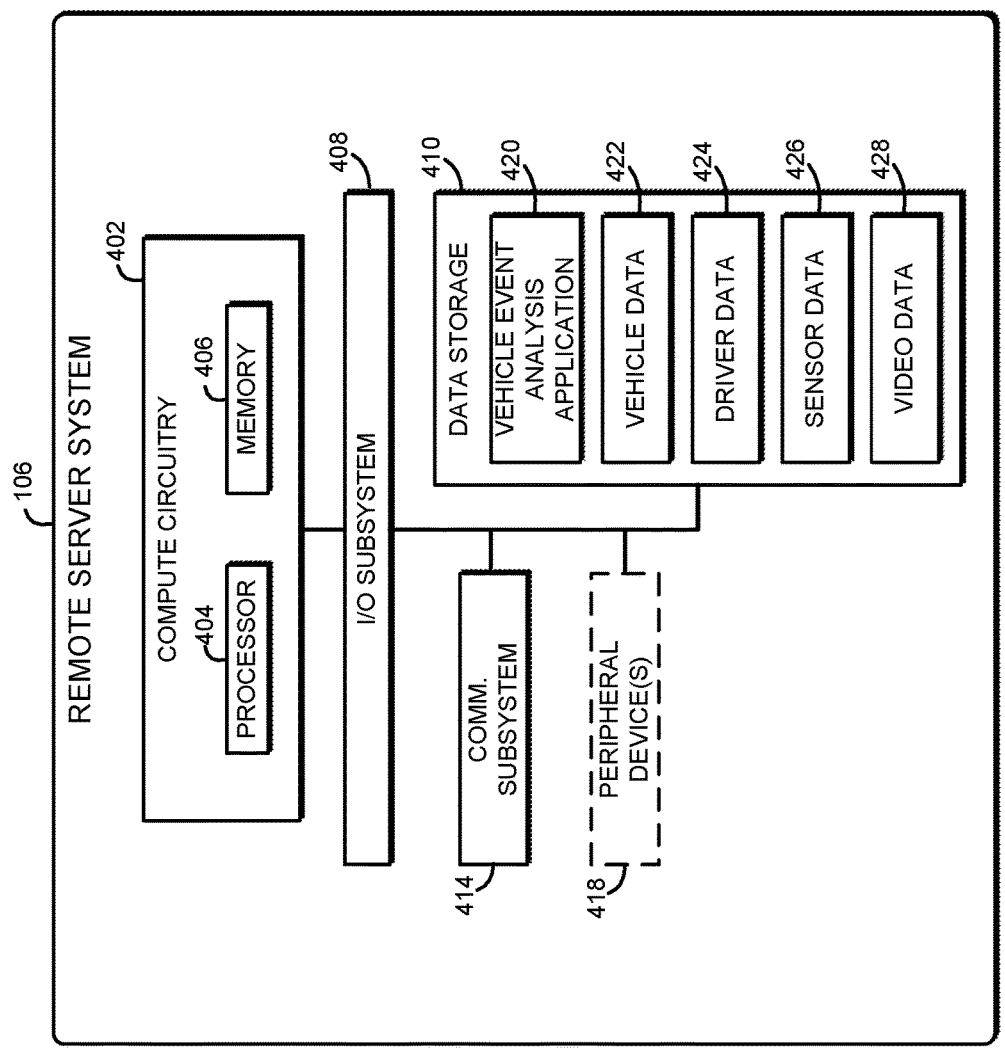
FIG. 4 is a simplified block diagram of at least one embodiment of a remote server of a remote server system of the system of FIG. 1.

The remote server system 112 may be embodied as one or more servers or compute devices of any type capable of communicating with the vehicle telematics device 102 to receive the sensor and video data and performing additional analytics on the received data. In the illustrative embodiment, as shown in FIG. 4, remote server system 112 includes compute circuitry 402 (including one or more processors 404 and memories 406), an input/output ("I/O") subsystem 408, a data storage 410, a communication subsystem 414, and, optionally, one or more peripheral devices 418. Of course, it should be appreciated that the remote server system 112 may include other or additional components, such as those commonly found in a typical compute device or control unit, in other embodiments. Additionally, in some embodiments, one or more of the illustrative components may be incorporated in, or otherwise form a portion of, another component.

Each of the compute circuitry 402, the processor(s) 404, the memory(s) 406, the input/output ("I/O") subsystem 408, the data storage 410, the communication subsystem 414, and the peripheral devices 418 are each substantially similar to the compute circuitry 202, the processor(s) 204, the memory(s) 206, the input/output ("I/O") subsystem 208, the data storage 210, the communication subsystem 214, and the peripheral devices 218 of the vehicle telematics device 102. As such, the above description of those components of the vehicle telematics device 102 is equally applicable to corresponding components of the remote server system 112 and is not repeated in this section for clarity of the description.

Similar to the data storage 210 of the vehicle telematics device 102, the data storage 410 of the remote server system 112 includes a vehicle event analysis application 420, vehicle data 422, driver data 424, sensor data 426, and video data 428. The vehicle event analysis application 420 is illustratively be embodied as a set of software and/or firmware instructions, which may be executed by the compute circuitry 402 (e.g., by the processor 204) to perform various analysis on the sensor data and/or video data received from the vehicle telematics device 102 to verify the occurrence of a vehicle event, determined additional information about the vehicle event, and/or otherwise assess the driver's behavior based on the detected vehicle event. For example, in some embodiments, the vehicle telematics device 102 may be visual analytics on the video data to detect speeding violations, stop sign violations, lane drifts, tailgating vehicles in front, among various other types of driver behavior and/or inertia and/or crash analytics on the sensor data to determine vehicle crash events.

The vehicle data 422 may be embodied as any type of data that describes a characteristic of the vehicle 110 and/or vehicle policy rules that define safety parameters of the vehicle 110. As such, the vehicle data 422 may be a copy of the vehicle data 222 of the vehicle telematics device 102 or as an aggregation of vehicle data 222 from multiple vehicle telematics devices 102. Additionally, the vehicle data 422 may include additional or other data relative to the vehicle data 222.

The driver data 424 may be embodied as any type of data that describes a characteristic of the driver of the vehicle 110 and/or driver policy rules define safety parameters of the driver. As such, the driver data 424 may be a copy of the driver data 224 of the vehicle telematics device 102 or as an aggregation of driver data 224 from multiple vehicle telematics devices 102. Additionally, the driver data 424 may include additional or other data relative to the driver data 224, such as driver data 424 for other drivers.

The sensor data 426 may be embodied as any type of data obtained from vehicle sensors 104 of the vehicle 110 (and/or the onboard sensors 216) that is indicative of characteristics of the vehicle 110 and/or a driver of the vehicle 110 during operation of the vehicle 110. As such, the sensor data 426 may be a copy of the sensor data 226 of the vehicle telematics device 102 or as an aggregation of sensor data 226 from multiple vehicle telematics devices 102. Additionally, the sensor data 426 may include additional or other sensor data relative to the sensor data 226.

The video data 428 may be embodied as any type of video or image data obtained from the vehicle camera system 106 that is associated with or otherwise indicative of the detected vehicle event. As such, the video data 428 may be a copy of the video data 228 of the vehicle telematics device 102 or as an aggregation of video data 228 from multiple vehicle telematics devices 102. Additionally, the video data 428 may include additional or other sensor data relative to the video data 228.

Referring back to FIG. 1, as discussed above, the vehicle telematics device 102 and the remote server system 112 are configured to communicate each other over the network 114. The network 114 may be embodied as any number of various wired and/or wireless networks, or hybrids or combinations thereof. For example, the network 114 may be embodied as, or otherwise include, a cellular network, a mobile access network, a network edge infrastructure, a wired or wireless local area network (LAN), and/or a wired or wireless wide area network (WAN), a public, global network such as the Internet. As such, the network 114 may include any number of additional devices, such as additional base stations, access points, computers, routers, and switches, to facilitate communications among the devices of the system 100.

Figure 5:
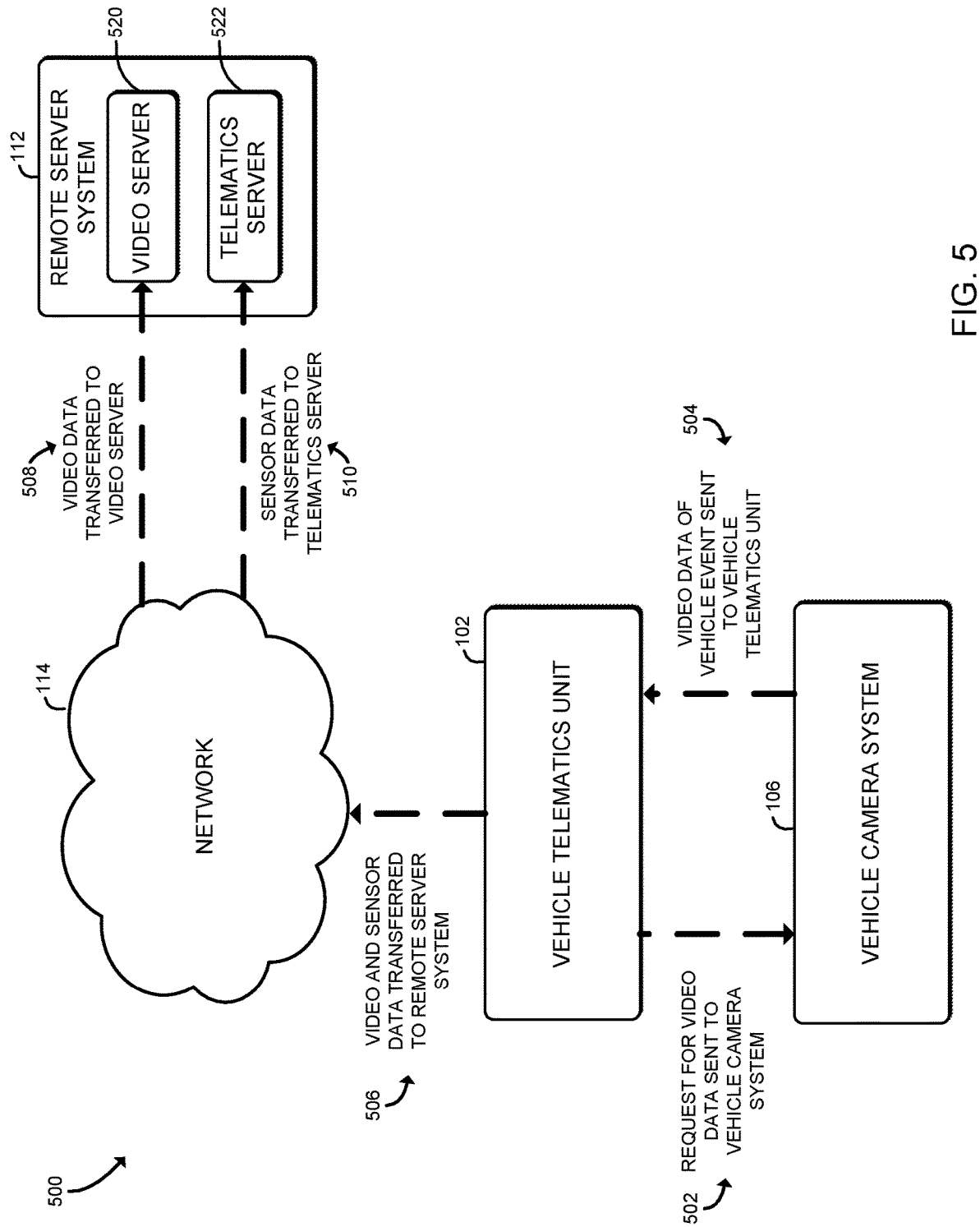
FIG. 5 is a simplified block diagram of a communication flow of an embodiment of the system of FIG. 1.

Referring now to FIG. 5, a communication flow 500 of the illustrative embodiment in which the vehicle telematics device 102 initially detects a vehicle event is shown. In such embodiments, the vehicle telematics device 102 is configured to monitor and analyze the sensor data produced by the vehicle sensors 104 to detect whether a vehicle event is occurring. If so, the vehicle telematics device 102 sends a request for video data to the vehicle camera system 106 in communication 502. In response, the vehicle camera system 106 transmits video data associated with the detected vehicle event to the vehicle telematics device 102 in communication 504. The vehicle telematics device 102, in turn, transmits the video data and sensor data to the remote server system 112 in communication 506. Additionally or alternatively, as discussed above, the vehicle telematics device 102 may prepare a vehicle event message, which may include the sensor data and/or video data along with additional information, and transmits the vehicle event message in communication 506.

Regardless, the vehicle telematics device 102 transmits the video data and sensor data to the remote server system 112 over the network 114. As discussed above, in some embodiments, the remote server system 112 may be embodied as multiple servers, such as an independent video server 520 and an independent telematics server 522 which may be in communication with each other. In such embodiments, the video data is transferred to the video server 520 in communication 508, and the sensor data is transferred to the telematics server 522 in communication 510.

Figure 6:
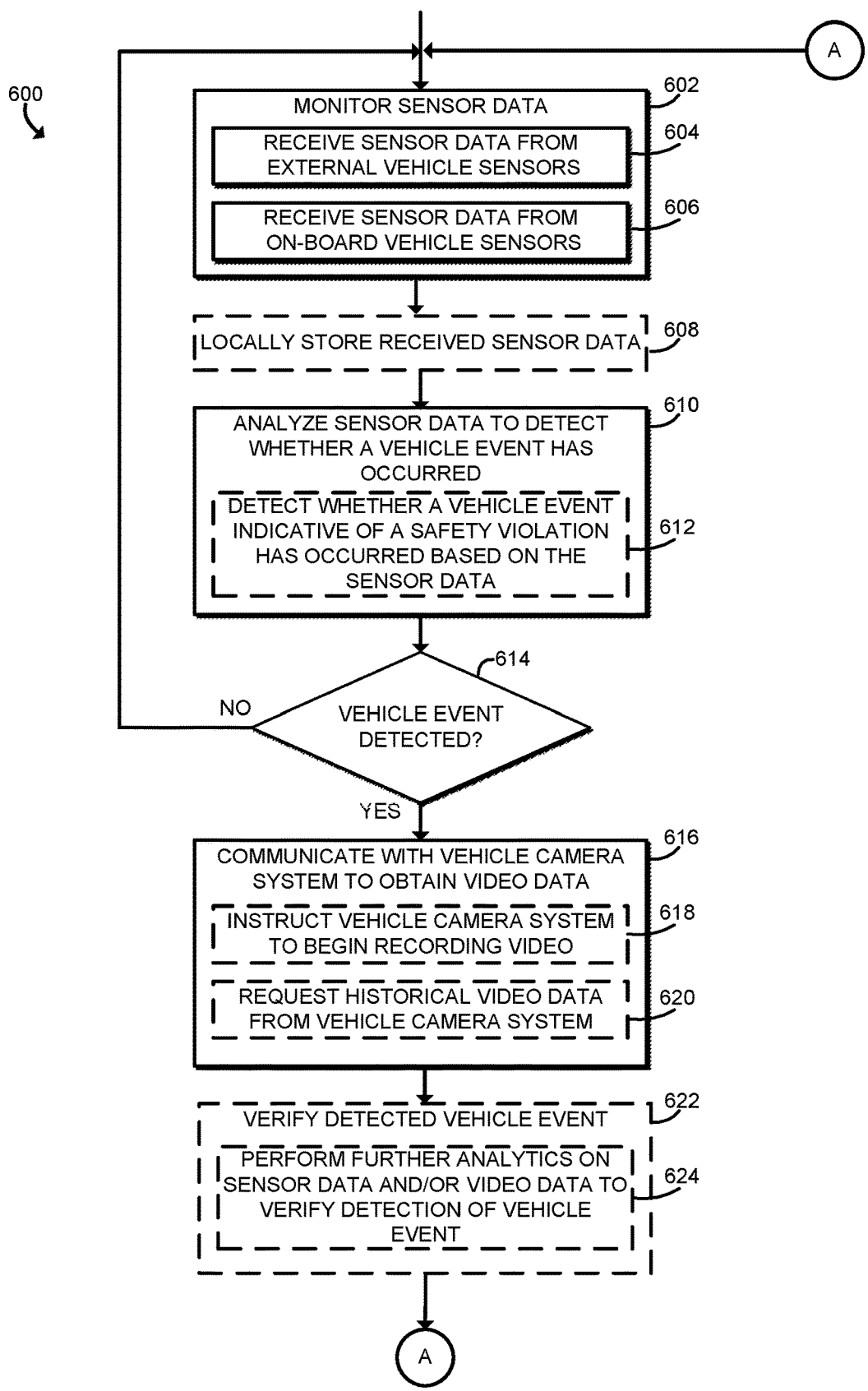
FIGS. 6 and 7 are a simplified flow chart of at least one embodiment of a method for driver behavior assessment.
Figure 7:
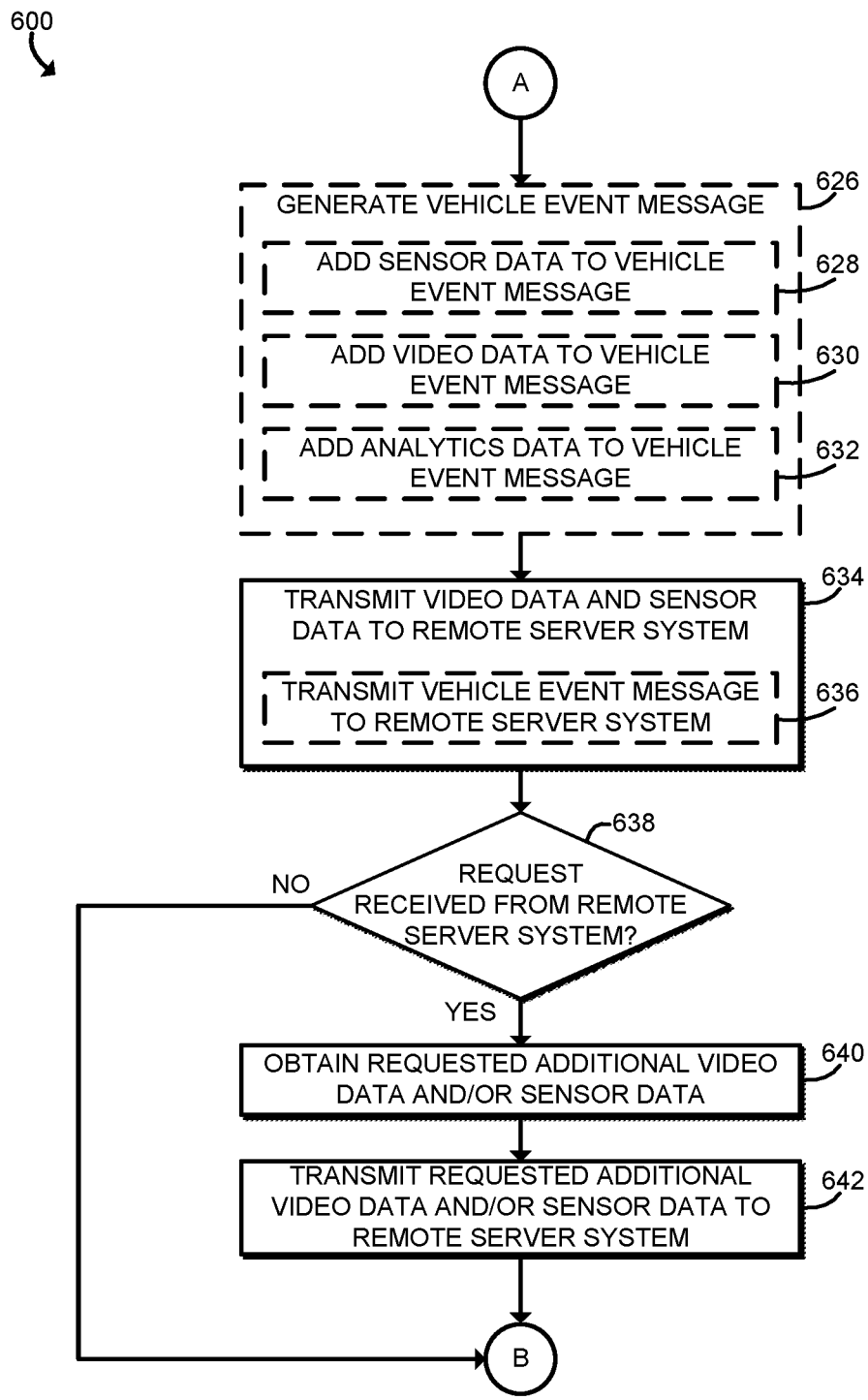

Referring now to FIGS. 6 and 7, in those embodiments in which the vehicle telematics device 102 is configured to initially detect a vehicle event, the vehicle telematics device 102 may execute a method 600 for driver behavior assessment. The method 600 may be embodied as the vehicle event detection application or other set of instructions, which may be stored in the data storage 210 and loaded into the memory 206 for execution by the processor 204 of the vehicle telematics device 102.

The method 600 begins with block 602 in which the vehicle telematics device 102 monitors the sensor data produced by the vehicle sensors 104 and, in some embodiments, the onboard sensors 216. To do so, the vehicle telematics device 102 may utilize any sensor monitoring techniques such as polling to periodically request sensor data or a doorbell technique in which the vehicle sensor 104 notify the vehicle telematics device 102 when sensor data is available. Regardless, in block 604, the vehicle telematics device 102 receives the sensor data produced by the one or more vehicle sensors 104. Additionally, in embodiments in which the vehicle telematics device 102 includes the onboard sensors 216, the vehicle telematics device 102 may receive sensor data from those onboard sensors 216 in block 606. As discussed above, the vehicle sensors 104 may provide the sensor data to the vehicle telematics device 102 over the vehicle data bus 120.

In some embodiments, the vehicle telematics device 102 may locally store the sensor data in block 608. For example, the vehicle telematics device 102 may store the obtained sensor data in the memory 206 and/or the data storage 210 (e.g., as sensor data 226). In this way, the vehicle telematics device 102 can monitor sensor data obtained from the vehicle sensors 104 over a period of time.

In block 610, the vehicle telematics device 102 analyzes the sensor data received from the vehicle sensors 104 to detect whether a vehicle event has occurred. For example, as shown in block 612 and discussed above, the vehicle telematics device 102 may analyze the sensor data to detect whether a vehicle event indicative of a safety violation in the operation of the vehicle 110 has occurred. To do so, in some embodiments, the vehicle telematics device 102 the may compare the obtained sensor data against reference thresholds, averages, trend lines, historical references, and/or other references. For example, the vehicle telematics device 102 may compare the sensor data to a vehicle policy stored in the vehicle data 222, which may define safety parameters of the vehicle and/or operation thereof (e.g., a maximum allowed speed, an allowable length of operation, etc.). Depending on the type and number of sensor data, the vehicle telematics device 102 may utilize any suitable analytical algorithm or methodology to determine whether a vehicle event has occurred based on the sensor data. For example, in some embodiments, the vehicle telematics device 102 may use a machine learning or artificial intelligence algorithm to analyze sensor data from multiple sensors and across multiple time periods. Additionally, in some embodiments, the vehicle telematics device 102 may use a classification algorithm to analyze the sensor data and detect the occurrence of a vehicle event. In some particular embodiments, for example, the vehicle telematics device 102 may use a crash determination algorithm as described in U.S. Pat. No. 10,055,909, entitled "Systems and Methods for Crash Determination," issued on Aug. 21, 2018 to CalAmp Corp., which is herein incorporated by reference in its entirety. Furthermore, depending on the type of sensor data, the vehicle telematics device 102 may apply different weighting factors to the different sensor data.

In block 614, the vehicle telematics device 102 determines whether a vehicle event was detected. If not, the method 600 loops back to block 602 in which the vehicle telematics device 102 continues to monitor sensor data from the vehicle sensors 104. If, however, the vehicle telematics device 102 has detected a vehicle event based on the sensor data, the method 600 advances to block 616. In block 616, the vehicle telematics device 102 communicates with the vehicle camera system 106 to obtain video data associated with the detected vehicle event. To do so, in some embodiments, the vehicle telematics device 102 may transmit an instruction to the vehicle camera system 106 to initiate recording of video in block 618 (e.g., an instruction that each of the road-facing camera 132 and the driver-facing camera 134 begin recording). Alternatively, in other embodiments, the vehicle camera system 106 may be configured to continually record video and, in such embodiments, the vehicle telematics device 102 may simply request the vehicle camera system 106 start providing the recorded video (i.e., the vehicle telematics device 102 may not directly control the recording of video by the vehicle camera system 106). Additionally, in some embodiments, the vehicle telematics device 102 may request historical video data from the vehicle camera system 106 in block 620. For example, the vehicle telematics device 102 may request video data beginning a predetermined amount of time prior to the detection of the vehicle event (e.g., ten seconds prior) so that the vehicle telematics device 102 has a complete visual record of the vehicle event.

In response, the vehicle camera system 106 transmits or otherwise provides the requested video data to the vehicle telematics device 102. For example, the vehicle camera system 106 may transmit the video data to the vehicle telematics device 102 via the camera I/O interface 122. As discussed above, the camera I/O interface 122 may be embodied as a wired and/or wireless interface, and the vehicle camera system 106 may transmit the video data to the vehicle telematics device 102 using any suitable communication technology and/or protocol, such as Wi-Fi, Bluetooth, etc.

After receiving the video data from the vehicle camera system 106, the vehicle telematics device 102 may verify the detected vehicle event in block 622 in some embodiments. That is, as shown in block 624, the vehicle telematics device 102 may further analyze the sensor data and/or video data to verify that the initially detected vehicle event has actually occurred. For example, in some embodiments, the vehicle telematics device 102 may perform some analysis (e.g., a "lightweight" analysis) of the video data to confirm the interpretation, based on the sensor data from the vehicle sensors 104, that a vehicle event has occurred.

If the vehicle telematics device 102 verifies the detection of the vehicle event or if no verification process is used, the method 600 advances to block 626 of FIG. 7. In block 626, in some embodiments, the vehicle telematics device 102 may generate a vehicle event message. The vehicle event message may be embodied as any type of message capable of notifying the remote server system 112 that the vehicle telematics device 102 has detected a vehicle event associated with the vehicle 110. For example, in some embodiments, the vehicle telematics device 102 may add or append the sensor data used by the vehicle telematics device 102 to detect the vehicle event to the vehicle event message in block 628. Additionally, the vehicle telematics device 102 may add or append the video data associated with the detected vehicle event and received from the vehicle camera system 106 to the vehicle event message in block 630. Furthermore, in some embodiments, the vehicle telematics device 102 may add analytics data to the vehicle event message in block 632. The analytics data may include any analysis data resulting from or from which the vehicle telematics device 102 determined that a vehicle event has occurred (e.g., the output of a machine learning or artificial intelligence algorithm).

Regardless, in block 634, the vehicle telematics device 102 transmits the video data and the sensor data to remote server system 112. The vehicle telematics device 102 may transmits the video data and sensor data separately or in association with each other. As discussed above, the video data and sensor data may be stored on separate or the same server of the remote server system 112. For example, the video data may be stored on the video server 520, and the sensor data may be stored on the telematics server 522. In any case, the vehicle telematics device 102 transmits the video and sensor data to the remote server system 112 over the network 114. In some embodiments, the vehicle telematics device 102 may be configured to cache the sensor data and/or video data and periodically or responsively transfer the data to the remote server system 112 (e.g., until a suitable connection is established across the network 114). In embodiments, in which the vehicle telematics device 102 generates the vehicle event message in block 626, the vehicle telematics device 102 may additionally or alternatively transmit the vehicle event message in block 636. For example, in some embodiments, the vehicle event message may include the sensor data, the video data, and additional analytical and/or informational data, and the vehicle telematics device 102 may transmit only the vehicle event message to the remote server system 112 in block 634.

After the vehicle telematics device 102 has transmitted the sensor data and video data in block 634, the vehicle telematics device 102 determines whether a request for further data has been received from the remote server system 112. For example, the remote server system 112 may perform additional analytics on the received sensor data and/or video data to verify, identify, and/or qualify the detected vehicle event. To do so, the remote server system 112 may utilize any suitable analytical algorithm or methodology to further analyze the sensor data and/or video data including, but not limited to, artificial intelligence algorithms such as classification algorithms, regression algorithms, and/or clustering algorithms. In doing so, the remote server system 112 may determine that additional sensor data, video data, and/or other information is need form the vehicle telematics device 102. If so, the remote server system 112 may transmit a request for such additional data and/or information to the vehicle telematics device 102.

If no request is received from the remote server system 112 in block 638, the method 600 loops back to block 602 in which the vehicle telematics device 102 continues to monitor the sensor data from the vehicle sensors 104. If, however, the vehicle telematics device 102 receives a request from the remote server system 112 in block 638, the method 600 advances to block 640. In block 640, the vehicle telematics device 102 obtains the requested additional video data, sensor data, or other information. The vehicle telematics device 102 subsequently transmits the requested additional video data, sensor data, or other information to the remote server system 112 in block 642, and the method 600 loops back to block 602.

Figure 8:
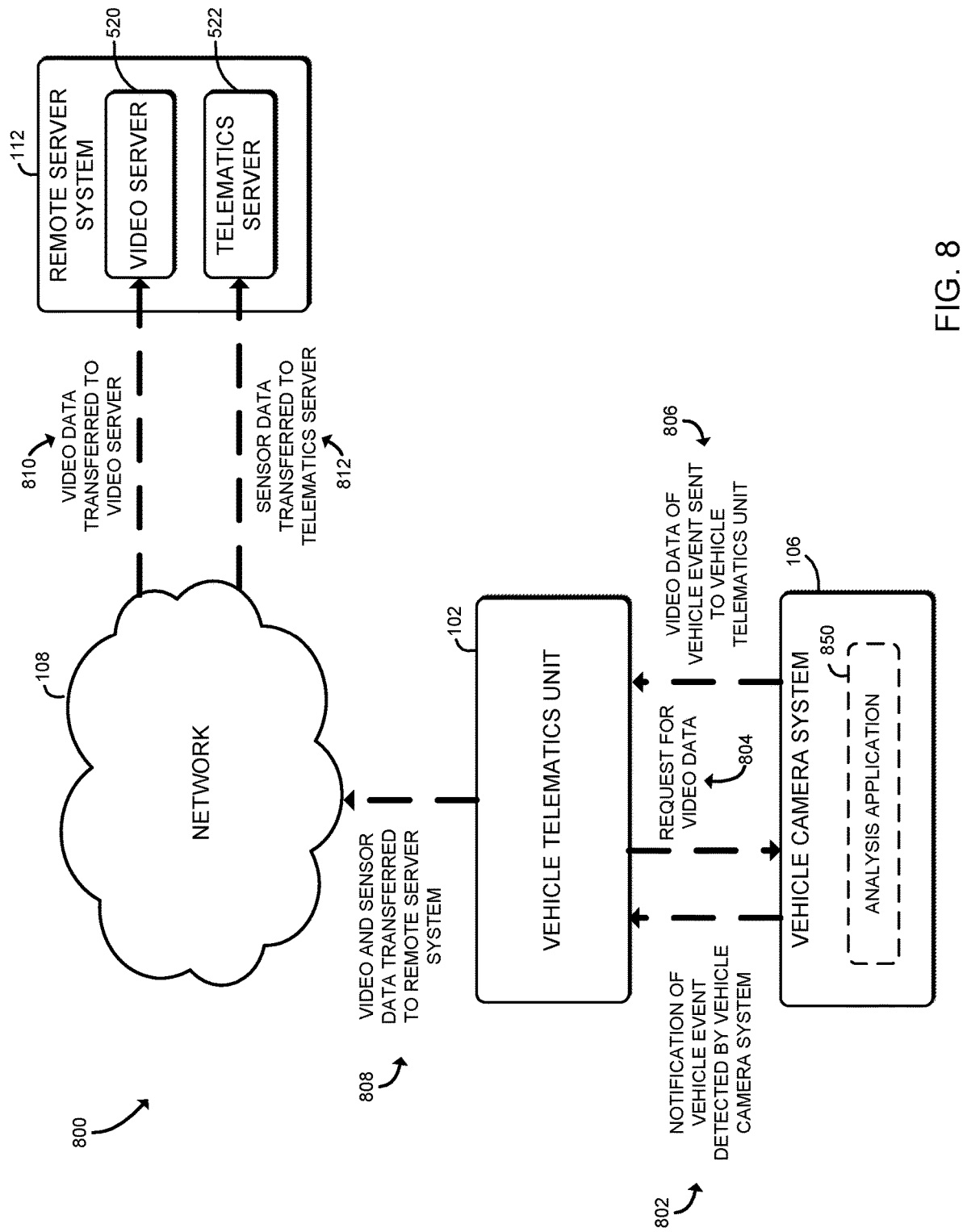
FIG. 8 is a simplified block diagram of a communication flow of another embodiment of the system of FIG. 1.

Referring now to FIG. 8, a communication flow 800 of the illustrative embodiment in which the vehicle camera system 106 initially detects a vehicle event is shown. In such embodiments, the vehicle camera system 106 may include an analysis application 850, which may be executed by the vehicle camera system 106 (e.g., by the road-facing camera 132 and/or the driver-facing camera 134) to perform analytics of the video data to detect whether a vehicle event is occurring (e.g., whether the vehicle 110 is speeding, has violated a stop sign, has drifted lanes, is tailgating, etc.). If so, the vehicle camera system 106 sends a notification to the vehicle telematics device 102 that a vehicle event has been detected in communication 802. In response, the vehicle telematics device 102 sends a request for video data associated with the detected vehicle event to the vehicle camera system 106 in communication 804. The vehicle camera system 106 subsequently transmits video data associated with the detected vehicle event to the vehicle telematics device 102 in communication 806. The vehicle telematics device 102, in turn, transmits the video data and sensor data to the remote server system 112 in communication 808. Additionally or alternatively, as discussed above, the vehicle telematics device 102 may prepare a vehicle event message, which may include the sensor data and/or video data along with additional information, and transmits the vehicle event message in communication 808.

Regardless, the vehicle telematics device 102 transmits the video data and sensor data to the remote server system 112 over the network 114. For example, the video data may be transferred to the video server 520 in communication 810, and the sensor data is transferred to the telematics server 522 in communication 812.

Figure 9:
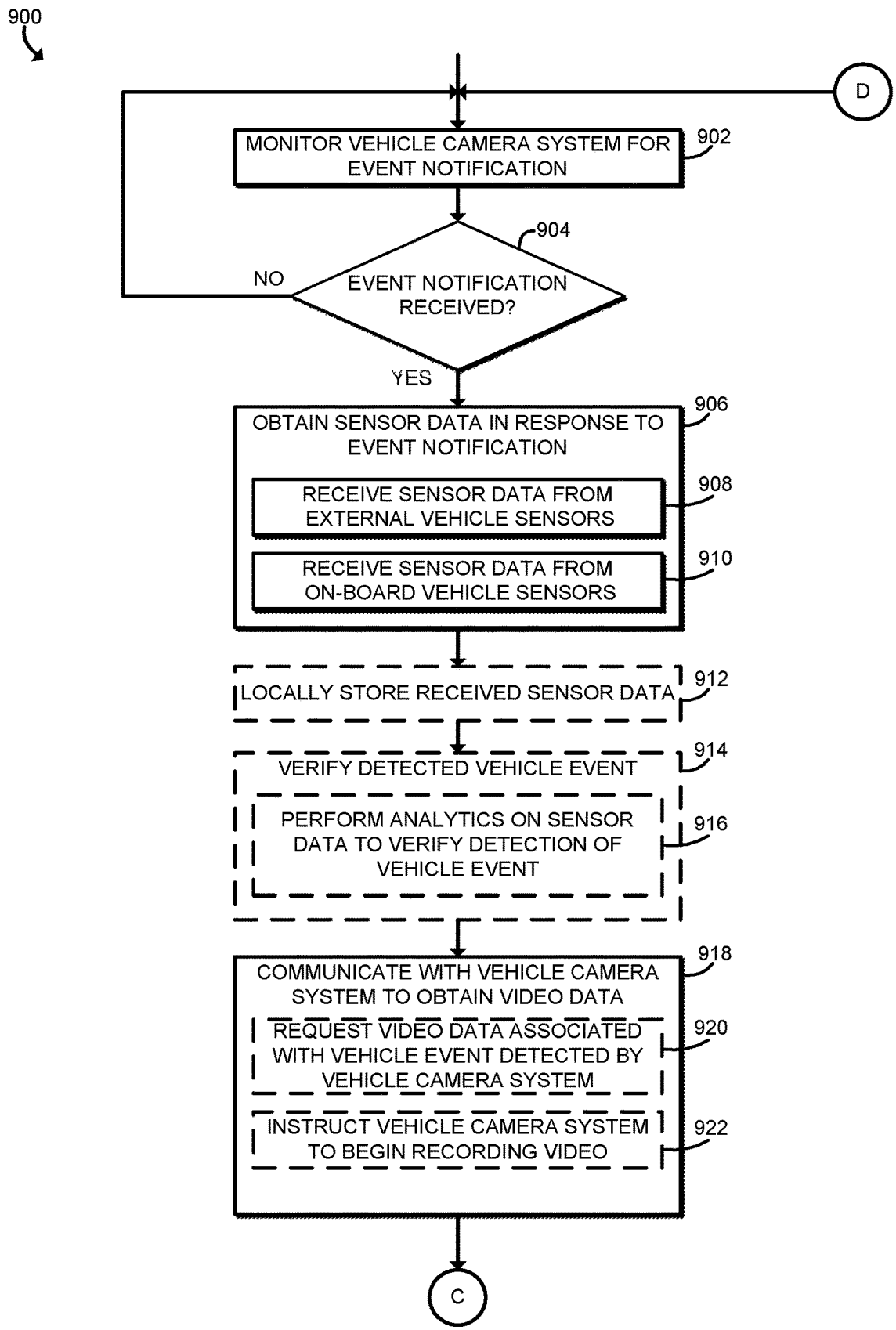
FIGS. 9 and 10 are a simplified flow chart of at least one other embodiment of a method for driver behavior assessment.
Figure 10:
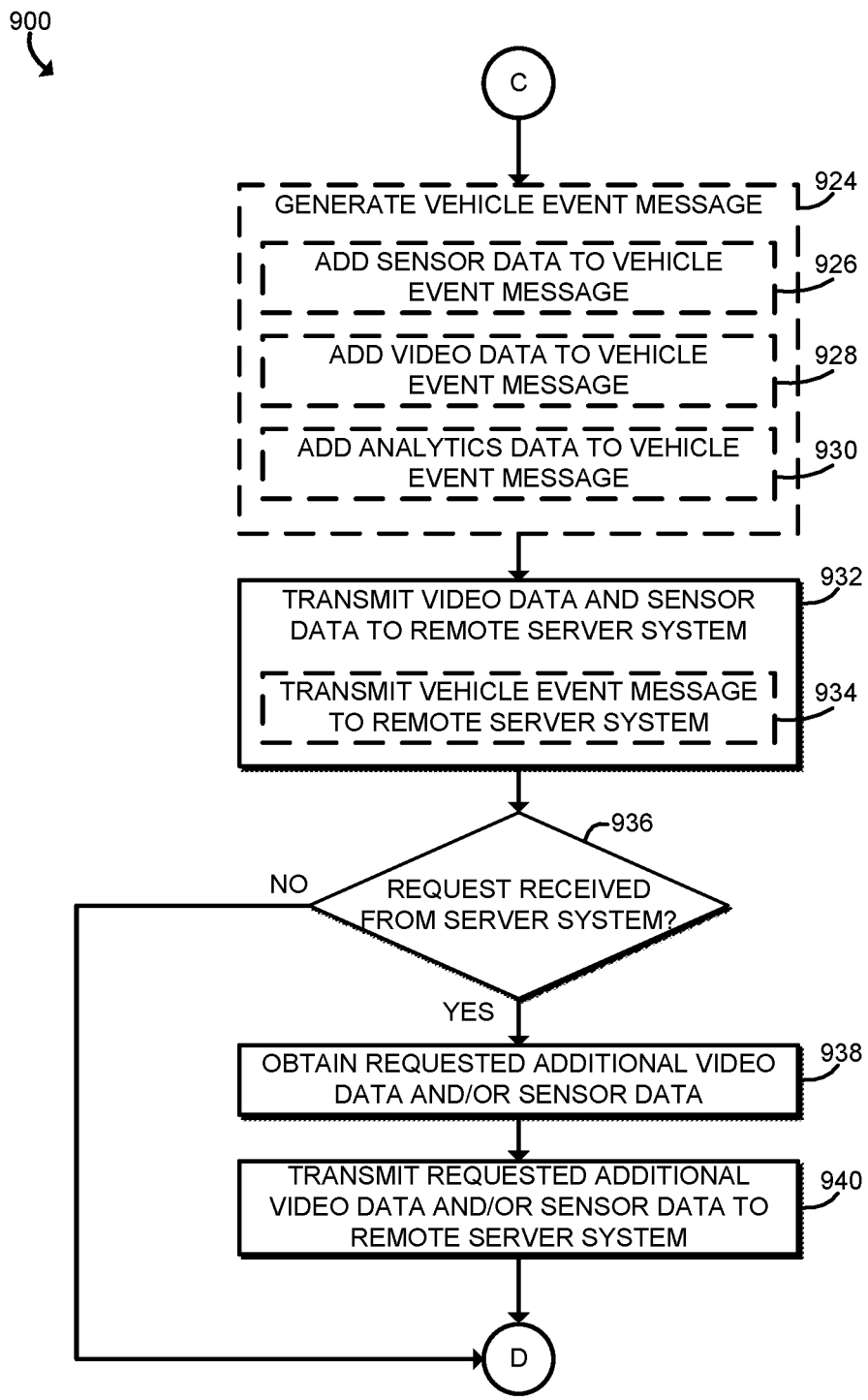

Referring now to FIGS. 9 and 10, in those embodiments in which the vehicle camera system 106 initially detects a vehicle event, the vehicle telematics device 102 may execute a method 900 for driver behavior assessment. Similar to the method 600 of FIGS. 6 and 7, the method 900 may be embodied as the vehicle event detection application or other set of instructions, which may be stored in the data storage 210 and loaded into the memory 206 for execution by the processor 204 of the vehicle telematics device 102.

The method 900 begins with block 902 in which the vehicle telematics device 102 monitors the vehicle camera system 106 for an event notification. That is, in the illustrative embodiment, the vehicle camera system 106 is configured to continually, periodically, or responsively analyze the video data (e.g., the video data from the road-facing camera 132 and/or the video data from the driver-facing camera 134) to detect whether a vehicle event has occurred. To do so, the vehicle camera system may utilize any suitable visual analytics on the video data to detect the occurrence of a vehicle event indicative of a safety violation (e.g., a speeding violation, a stop sign violation, lane drifting, tailgating, etc.). If the vehicle camera system 106 detects a vehicle event from the video data, the vehicle camera system 106 transmits an event notification to the vehicle telematics device 102, which is received by the vehicle telematics device 102 in block 904.

If the vehicle telematics device 102 does not receive an event notification from the vehicle camera system 106 in block 904, the method 900 loops back to block 902 in which the vehicle telematics device 102 continues to monitor for event notifications. If, however, an event notification is received form the vehicle camera system 106, the method 900 advances to block 906 in which the vehicle telematics device 102 obtains sensor data from the one or more vehicle sensors 104 and, in some embodiments, the onboard sensors 216. For example, in block 908, the vehicle telematics device 102 receives the sensor data produced by the one or more vehicle sensors 104. Additionally, in embodiments in which the vehicle telematics device 102 includes the onboard sensors 216, the vehicle telematics device 102 may receive sensor data from those onboard sensors 216 in block 910. As discussed above, the vehicle telematics device 102 may also locally store the sensor data in block 912. For example, the vehicle telematics device 102 may store the obtained sensor data in the memory 206 and/or the data storage 210 (e.g., as sensor data 226).

Subsequently, in block 916, the vehicle telematics device 102 may verify the detected vehicle event in some embodiments. That is, in the illustrative embodiment, the vehicle camera system 106 has detected a vehicle event based on the video data and notified the vehicle telematics device 102 of the vehicle event. As such, in some embodiments in block 916, the vehicle telematics device 102 may perform its own analysis on the sensor data received from the vehicle sensors 104 (and/or the onboard sensors 216) to verify a vehicle event has occurred or otherwise increase the confidence that such a vehicle event has occurred. As discussed above, the vehicle telematics device 102 may utilize any suitable analytical algorithm or methodology to verify the detection of the vehicle event depending on, for example, the type and number of sensor data. For example, in some embodiments, the vehicle telematics device 102 the may compare the obtained sensor data against reference thresholds, averages, trend lines, historical references, and/or other references. Additionally, in some embodiments, the vehicle telematics device 102 may compare the sensor data to a vehicle policy stored in the vehicle data 222, which may define safety parameters of the vehicle and/or operation thereof (e.g., a maximum allowed speed, an allowable length of operation, etc.). Further, as discussed above, the vehicle telematics device 102 may use a machine learning or artificial intelligence algorithm to analyze sensor data from multiple sensors and across multiple time periods.

If the vehicle telematics device 102 determines that the detected vehicle event is verified (or if no verification is used), the vehicle telematics device 102 communicates with the vehicle camera system 106 to obtain video data associated with the detected vehicle event in block 918. To do so, in some embodiments, the vehicle telematics device 102 may transmit an instruction to the vehicle camera system 106 to initiate recording of video in block 920 (e.g., an instruction that each of the road-facing camera 132 and the driver-facing camera 134 begin recording). Alternatively, in other embodiments as discussed above, the vehicle camera system 106 may be configured to continually record video and, in such embodiments, the vehicle telematics device 102 may simply request the vehicle camera system 106 start providing the recorded video (i.e., the vehicle telematics device 102 may not directly control the recording of video by the vehicle camera system 106). Additionally, in some embodiments, the vehicle telematics device 102 may request historical video data from the vehicle camera system 106 in block 922. For example, the vehicle telematics device 102 may request video data beginning a predetermined amount of time prior to the detection of the vehicle event (e.g., ten seconds prior) so that the vehicle telematics device 102 has a complete visual record of the vehicle event. In response, the vehicle camera system 106 transmits or otherwise provides the requested video data to the vehicle telematics device 102. For example, the vehicle camera system 106 may transmit the video data to the vehicle telematics device 102 via the camera I/O interface 122.

After the vehicle telematics device 102 receives the video data from the vehicle camera system 106, the method 900 advances to block 924 of FIG. 10. In block 924, the vehicle telematics device 102 may generate a vehicle event message. As discussed above, the vehicle event message may be embodied as any type of message capable of notifying the remote server system 112 that the vehicle telematics device 102 has detected a vehicle event associated with the vehicle 110. For example, in some embodiments, the vehicle telematics device 102 may add or append the sensor data used by the vehicle telematics device 102 to detect the vehicle event to the vehicle event message in block 926. Additionally, the vehicle telematics device 102 may add or append the video data associated with the detected vehicle event and received from the vehicle camera system 106 to the vehicle event message in block 928. Furthermore, in some embodiments, the vehicle telematics device 102 may add analytics data to the vehicle event message in block 930. As discussed above, the analytics data may include any analysis data resulting from or from which the vehicle telematics device 102 determined that a vehicle event has occurred (e.g., the output of a machine learning or artificial intelligence algorithm).

Regardless, in block 932, the vehicle telematics device 102 transmits the video data and the sensor data to remote server system 112. Again, as discussed above, the vehicle telematics device 102 may transmits the video data and sensor data separately or in association with each other. The video data and sensor data may be stored on separate or the same server of the remote server system 112. For example, the video data may be stored on the video server 520, and the sensor data may be stored on the telematics server 522. In any case, the vehicle telematics device 102 transmits the video and sensor data to the remote server system 112 over the network 114 as discussed above. Additionally, in some embodiments, the vehicle telematics device 102 may be configured to cache the sensor data and/or video data and periodically or responsively transfer the data to the remote server system 112 (e.g., until a suitable connection is established across the network 114). In embodiments, in which the vehicle telematics device 102 generates the vehicle event message in block 626, the vehicle telematics device 102 may additionally or alternatively transmit the vehicle event message in block 934. For example, in some embodiments, the vehicle event message may include the sensor data, the video data, and additional analytical and/or informational data, and the vehicle telematics device 102 may transmit only the vehicle event message to the remote server system 112 in block 934.

After the vehicle telematics device 102 has transmitted the sensor data and video data in block 934, the vehicle telematics device 102 determines whether a request for further data has been received from the remote server system 112 in block 936. If no request is received from the remote server system 112 in block 936, the method 900 loops back to block 902 in which the vehicle telematics device 102 continues to monitor for event notifications from the vehicle camera system 106. If, however, the vehicle telematics device 102 receives a request from the remote server system 112 in block 936, the method 900 advances to block 938. In block 938, the vehicle telematics device 102 obtains the requested additional video data, sensor data, or other information. The vehicle telematics device 102 subsequently transmits the requested additional video data, sensor data, or other information to the remote server system 112 in block 940, and the method 900 loops back to block 902.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the methods, apparatuses, and/or systems described herein. It will be noted that alternative embodiments of the methods, apparatuses, and/or systems of the present disclosure may not include all of the features described yet still benefit from at least some of the advantages of such features. Those of ordinary skill in the art may readily devise their own implementations of the methods, apparatuses, and/or systems that incorporate one or more of the features of the present invention and fall within the spirit and scope of the present disclosure as defined by the appended claims.

The invention claimed is:

1. A vehicle telematics device for assessing driver behavior, the vehicle telematics device comprising:
   a camera interface configured to communicate with a vehicle camera system of a vehicle to obtain video data produced by the vehicle camera system;
   one or more processors; and
   one or more memory devices communicatively coupled to the one or more processors and having stored therein a plurality of instructions that, when executed by the one or more processors, cause the vehicle telematics device to:
      obtain sensor data from at least one vehicle sensor of the vehicle, wherein the sensor data is non-video sensor data indicative of a characteristic of the vehicle;
      analyze the sensor data to detect whether a vehicle event has occurred;
      communicate, in response to detection of the vehicle event, with the vehicle camera system to obtain video data associated with the detected vehicle event from the vehicle camera system;
      locally analyze, in response to the detection of the vehicle event and receipt of the video data, the video data associated with the detected vehicle event to verify that the detected vehicle event has occurred as detected based on the analysis of the sensor data; and
      transmit, in response to verification that the detected event has occurred, the video data associated with the detected vehicle event and the sensor data to a remote server system.

2. The vehicle telematics device of claim 1, wherein to obtain the sensor data comprises to obtain sensor data from a vehicle sensor external to the vehicle telematics device and installed in the vehicle.

3. The vehicle telematics device of claim 1, wherein to obtain the sensor data comprises to obtain sensor data from a vehicle sensor located in the vehicle telematics device.

4. The vehicle telematics device of claim 1, wherein to analyze the sensor data comprises to analyze the sensor data to detect whether a vehicle event indicative of a safety violation of the operation of the vehicle has occurred.

5. The vehicle telematics device of claim 4, wherein to analyze the sensor data comprises to analyze the sensor data over a period of time.

6. The vehicle telematics device of claim 4, wherein to analyze the sensor data comprises to compare the sensor data to a reference threshold.

7. The vehicle telematics device of claim 1, wherein to communicate with the vehicle camera system comprises to transmit, in response to detection of the vehicle event, an instruction to the vehicle camera system to begin recording video.

8. The vehicle telematics device of claim 1, wherein to communicate with the vehicle camera system comprises to request video data from the vehicle camera system that includes a time period prior to the detection of the vehicle event.

9. The vehicle telematics device of claim 1, wherein the plurality of instructions, when executed by the one or more processors, further cause the vehicle telematics device to generate a vehicle event message in response to detection of the vehicle event, wherein the vehicle event message includes the video data associated with the detected vehicle event and the sensor data, and
wherein to transmit the video data associated with the detected vehicle event and the sensor data comprises to transmit the vehicle event message to the remote server system.

10. The vehicle telematics device of claim 1, wherein the plurality of instructions, when executed by the one or more processors, further cause the vehicle telematics device to:
monitor for a request from the remote server system subsequent to the transmission of the video data associated with the detected vehicle event and the transmitted sensor data;
obtain, based on the request, additional sensor data from at least one vehicle sensor of the vehicle; and
transmit the additional sensor data to the remote server system.

11. The vehicle telematics device of claim 1, wherein the plurality of instructions, when executed by the one or more processors, further cause the vehicle telematics device to:
monitor for a request from the remote server system subsequent to the transmission of the video data associated with the detected vehicle event and the transmitted sensor data;
obtain, based on the request, additional video data from the vehicle camera system; and
transmit the additional video data to the remote server system.

12. A method for assigning deriver behavior of a vehicle, the method comprising:
obtaining, by a vehicle telematics device, sensor data from at least one vehicle sensor of the vehicle, wherein the sensor data is non-video sensor data indicative of a characteristic of the vehicle;
analyzing, by the vehicle telematics device, the sensor data to detect whether a vehicle event has occurred;
communicating, by the vehicle telematics device and in response to detection of the vehicle event, with a vehicle camera system of the vehicle to obtain video data associated with the detected vehicle event from the vehicle camera system;
locally analyzing, by the vehicle telematics device and in response to the detection of the vehicle event and receipt of the video data, the video data associated with the detected vehicle event to verify that the detected vehicle event has occurred as detected based on the analysis of the sensor data; and
transmitting, by the vehicle telematics device and in response to verification that the detected event has occurred, the video data associated with the detected vehicle event and the sensor data to a remote server system.

13. The method of claim 12, wherein analyzing the sensor data comprises analyzing the sensor data to detect whether a vehicle event indicative of a safety violation of the operation of the vehicle has occurred.

14. The method of claim 12, wherein communicating with the vehicle camera system comprises transmitting, by the vehicle telematics device and in response to detection of the vehicle event, an instruction to the vehicle camera system to begin recording video.

15. The method of claim 12, further comprising
monitoring, by the vehicle telematics device, for a request from the remote server system subsequent to the transmission of the video data associated with the detected vehicle event and the transmitted sensor data;
obtaining, based on the request, additional sensor data from at least one vehicle sensor of the vehicle; and
transmitting the additional sensor data to the remote server system.

16. One or more non-transitory, machine-readable storage media comprising a plurality of instructions stored thereon that, when executed, cause a vehicle telematics device to:
obtain sensor data from at least one vehicle sensor of a vehicle, wherein the sensor data is non-video sensor data indicative of a characteristic of the vehicle;
analyze the sensor data to detect whether a vehicle event has occurred;
communicate, in response to detection of the vehicle event, with a vehicle camera system of the vehicle to obtain video data associated with the detected vehicle event from the vehicle camera system;
locally analyze, in response to the detection of the vehicle event and receipt of the video data, the video data associated with the detected vehicle event to verify that the detected vehicle event has occurred as detected based on the analysis of the sensor data; and
transmit, in response to verification that the detected event has occurred, the video data associated with the detected vehicle event and the sensor data to a remote server system.

17. The one or more non-transitory, machine-readable storage media of claim 16, wherein to analyze the sensor data comprises to analyze the sensor data to detect whether a vehicle event indicative of a safety violation of the operation of the vehicle has occurred.

18. The one or more non-transitory, machine-readable storage media of claim 16, wherein to communicate with the vehicle camera system comprises to transmit, in response to detection of the vehicle event, an instruction to the vehicle camera system to begin recording video.

19. The one or more non-transitory, machine-readable storage media of claim 16, wherein the plurality of instructions, when executed, further cause the vehicle telematics device to:
monitor for a request from the remote server system subsequent to the transmission of the video data associated with the detected vehicle event and the transmitted sensor data;
obtain, based on the request, additional sensor data from at least one vehicle sensor of the vehicle; and
transmit the additional sensor data to the remote server system.

* * * * *